United States Patent
Woodard et al.

(10) Patent No.: US 12,240,771 B2
(45) Date of Patent: Mar. 4, 2025

(54) SYSTEM AND METHOD FOR SEPARATING COMPETING ANIONS FROM PER- AND POLYFLUOROALKYL SUBSTANCES (PFAS) IN A FLOW OF WATER

(71) Applicant: Emerging Compounds Treatment Technologies, Inc., Irvine, CA (US)

(72) Inventors: Steven E. Woodard, Cumberland, ME (US); Michael G. Nickelsen, Fuquay-Varina, NC (US); John C. Berry, Mooresville, NC (US)

(73) Assignee: Emerging Compounds Treatment Technologies, Inc., Irvine, CA (US)

( * ) Notice: Subject to any disclaimer, the term of this patent is extended or adjusted under 35 U.S.C. 154(b) by 0 days.

(21) Appl. No.: 17/703,221

(22) Filed: Mar. 24, 2022

(65) Prior Publication Data
US 2022/0315453 A1    Oct. 6, 2022

Related U.S. Application Data

(60) Provisional application No. 63/169,987, filed on Apr. 2, 2021.

(51) Int. Cl.
*B01D 15/36* (2006.01)
*B01D 61/04* (2006.01)
(Continued)

(52) U.S. Cl.
CPC .............. *C02F 1/42* (2013.01); *B01D 15/363* (2013.01); *B01D 61/04* (2013.01); *B01D 61/145* (2013.01);
(Continued)

(58) Field of Classification Search
CPC ...... B01D 15/363; B01D 61/08; B01D 61/18; C02F 2001/422
See application file for complete search history.

(56) References Cited

U.S. PATENT DOCUMENTS

| | | | |
|---|---|---|---|
| 3,969,336 A | * | 7/1976 | Criswell ................. A23J 1/205 530/859 |
| 2014/0048490 A1 | * | 2/2014 | Roelen .................... C02F 1/442 210/708 |
| 2020/0180979 A1 | | 6/2020 | Nickelsen et al. |

FOREIGN PATENT DOCUMENTS

| | | | |
|---|---|---|---|
| CN | 205287673 U | * | 6/2016 |
| WO | 2020068538 A1 | | 4/2020 |
| WO | 2020247029 A1 | | 12/2020 |

OTHER PUBLICATIONS

Yu B—CN-205287673-U machine translation—Jun. 2016 (Year: 2016).*

(Continued)

*Primary Examiner* — Bradley R Spies
(74) *Attorney, Agent, or Firm* — Iandiorio Teska & Coleman, LLP (57) ABSTRACT

A system for separating competing anions from per- and polyfluoroalkyl substances (PFAS) in a flow of water contaminated with PFAS and elevated levels of competing anions that includes a separation subsystem which receives the flow of water contaminated with PFAS and elevated levels of competing anions and separates competing anions from the PFAS and concentrates the PFAS to produce a treated flow of water having separated competing anions therein and a flow of water having a majority of PFAS therein. At least one anion exchange vessel having an anion exchange resin therein receives the flow of water having a majority of PFAS therein and removes PFAS from the water to produce a flow of treated water having a majority of the PFAS removed. The separation of competing anions by the separation subsystem increases the treatment capacity of the anion exchange resin to remove PFAS from the contaminated water.

31 Claims, 7 Drawing Sheets

(51) Int. Cl.
    *B01D 61/14*    (2006.01)
    *C02F 1/42*    (2023.01)
    *C02F 9/00*    (2023.01)
    *C02F 101/36*    (2006.01)
    *C02F 103/00*    (2006.01)

(52) U.S. Cl.
    CPC .......... *C02F 9/00* (2013.01); *C02F 2001/422* (2013.01); *C02F 2101/36* (2013.01); *C02F 2103/007* (2013.01)

(56) References Cited

OTHER PUBLICATIONS

Franke, Vera, et al. "Efficient removal of per-and polyfluoroalkyl substances (PFASs) in drinking water treatment: nanofiltration combined with active carbon or anion exchange." Environmental Science: Water Research & Technology 5.11 (2019): 1836-1843. (Year: 2019).*

Boodoo, Francis, et al. "Polishing PFAS to non-detect levels using PFAS-selective resin." Polishing PFAS To Non-Detect Levels Using PFAS-Selective Resin (2019). (Year: 2019).*

Dixit et al., "Efficient Removal of GenX (HFPO-DA) and Other Perfluorinated Ether Acids from Drinking and Recycled Waters Using Anion Exchange Resins"; Journal of Hazardous Materials, vol. 384, (Feb. 15, 2020), p. 1-10.

Deng et al., "Removal of Perfluorooctane Sulfonate from Wastewater by Anion Exchange Resins: Effects of Resin Properties and Solution Chemistry"; Water Research, vol. 44, Issue 18, (Oct. 2010), p. 5188-5195.

Franke et al., "The Price of Really Clean Water: Combining Nanofiltration with Granular Activated Carbon and Anion Exchange Resins for the Removal of Per- and Polyfluoralkyl Substances (PFASs) in Drinking Water Production" ACS ES&T Water, vol. 1, Issue 4, (Apr. 9, 2021) p. 782-795.

Written Opinion from the International Searching Authority for International Application No. PCT/US2022/021715, dated Jun. 16, 2022, six (6) pages.

* cited by examiner

SYSTEM AND METHOD FOR SEPARATING COMPETING ANIONS FROM PER- AND POLYFLUOROALKYL SUBSTANCES (PFAS) IN A FLOW OF WATER

RELATED APPLICATIONS

This application claims benefit of and priority to U.S. Provisional Application Ser. No. 63/169,987 filed Apr. 2, 2021, under 35 U.S.C. §§ 119, 120, 363, 365, and 37 C.F.R. § 1.55 and § 1.78, which is incorporated herein by this reference.

FIELD OF THE INVENTION

This invention relates to a system and method for separating competing anions from per- and polyfluoroalkyl substances (PFAS) in a flow of water.

BACKGROUND OF THE INVENTION

Water contaminated with PFAS is often treated using anion exchange resins. The negatively charged hydrophilic heads of the PFAS bind to the positively charged sites on the anion exchange resins to facilitate their removal from contaminated water. Some waters contaminated with PFAS also contain elevated levels or concentrations of anions which compete with PFAS for the positively charged sites on the anion exchange resins. This may result in significant capacity reduction of the anion exchange resins for PFAS removal.

Thus, there is need for a pretreatment system and method to separate the competing anions from the PFAS prior to treatment of the water.

BRIEF SUMMARY OF THE INVENTION

In one aspect a system for separating competing anions from per- and polyfluoroalkyl substances (PFAS) in a flow of water contaminated with PFAS and elevated levels of competing anions therein is featured. The system includes a separation subsystem configured to receive the flow of contaminated water and is configured to separate competing anions from the PFAS and concentrate the PFAS to produce a treated flow of water having separated competing anions therein and a flow of water having a majority of PFAS therein. At least one anion exchange vessel having an anion exchange resin therein is configured to receive the flow of water having a majority of PFAS therein and remove PFAS from the water to produce a flow of treated water having a majority of the PFAS removed. The separation of competing anions by the separation subsystem increases the treatment capacity of the anion exchange resin to remove PFAS from the contaminated water.

In one embodiment, the anion exchange resin may include a regenerable anion exchange resin. The anion exchange resin may include a single use anion exchange resin. The separation subsystem may include a membrane separation subsystem. The membrane separation subsystem may include a nanofiltration subsystem. The membrane separation subsystem may include an ultrafiltration subsystem. The separation subsystem may include a foam fractionation subsystem. The foam fractionation subsystem may include a modified diffuser subsystem configured to increase the production and distribution of microbubbles and foam. The foam fractionation subsystem may include a vessel configured to receive the flow of water contaminated with PFAS and elevated levels of competing anions, a venturi eductor configured to introduce and mix a gas into a recycled flow of water having separated competing anions therein and generate a two-phase flow of microbubbles and water having separated competing anions therein, the modified diffuser may include a vortex tee inside a cylindrical baffle configured to receive the two-phase flow and induce rotational movement that generates intense mixing and turbulence to maximize the formation and distribution of microbubbles and foam to enhance PFAS removal from the contaminated water. The vortex tee may be spaced from a surface of the cylindrical baffle by a predetermined distance to maximize the rotational movement and turbulence of the two-phase flow of microbubbles and water having separated competing anions therein. The cylindrical baffle may be sized and positioned to separate the two-phase flow of microbubbles and water having separated competing anions therein from the treated flow of water having a majority of the PFAS removed which exits a bottom of the vessel. The foam fractionation subsystem may be configured to produce a concentrated flow of foam that transforms into the flow of water having the majority of the PFAS therein. The foam fractionation subsystem may include a heating device configured to enhance the transformation of the foam into the flow of water having the majority of PFAS therein.

The competing anions may include one or more of: chloride, sulfate, nitrate, bicarbonate, perchlorate. The flow of water contaminated with PFAS and elevated levels of competing anions may include industrial wastewater, landfill leachate, or contaminated groundwater. At least one supplemental surfactant may be added to increase the production of microbubbles and foam in the foam fractionation subsystem. The at least one supplemental surfactant may include an anionic, cationic, zwitterionic, nonionic, and/or protein-based surfactant.

In another aspect, a method for separating competing anions from per- and polyfluoroalkyl substances (PFAS) in a flow of water contaminated with PFAS and elevated levels of competing anions therein is featured. The method includes receiving the flow of water contaminated with PFAS and elevated levels of competing anions, separating competing anions from the PFAS and concentrating the PFAS to produce a treated flow of water having separated competing anions therein and a flow of water having a majority of the PFAS therein. The method also includes receiving the flow of water having a majority of the PFAS therein, removing the PFAS from the flow of water having a majority of the PFAS therein to produce a flow of treated water having a majority of the PFAS removed. The separation of competing anions from the PFAS increases a treatment capacity of an anion exchange resin to remove PFAS from the contaminated water.

In one embodiment, the anion exchange resin may include a regenerable anion exchange resin. The anion exchange resin may include a single use anion exchange resin. The separating may include membrane separation. The separating may include foam fractionation. The foam fractionation may include receiving the flow of water contaminated with PFAS and elevated levels of competing anions, introducing and mixing a gas into a recycled flow of water having separated competing anions therein and generating a two-phase flow of microbubbles and water having separated competing anions therein, and receiving the two-phase flow in a cylindrical baffle and inducing rotational movement that generates intense mixing and turbulence to maximize formation and distribution of the microbubbles and foam. The method may include separating the two-phase flow of microbubbles and water having separated competing anions therein from the treated flow of water having separated competing anions therein. The foam fractionation may be configured to produce a concentrated flow of foam that transforms into the flow of water having the majority of the PFAS therein. The foam fractionation may include heating the foam to enhance the transformation of the foam into the flow of water having the majority of PFAS therein.

The flow of water contaminated with PFAS and elevated levels of competing anions may include industrial wastewater, landfill leachate, or contaminated groundwater. The method may include adding a supplemental surfactant to increase the production of microbubbles and foam. The supplemental surfactant may include an anionic, cationic, zwitterionic, nonionic, and/or a protein-based surfactant.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As disclosed in U.S. Pat. No. 10,287,185, incorporated by reference herein, by one or more of the inventors hereof, anion exchange resins can be used to remove PFAS from contaminated water. As discussed in the Background section above, some waters contaminated with PFAS may also contain elevated levels or concentrations of anions, e.g., chloride ($Cl^-$), sulfate ($SO_4^{2-}$), nitrate ($NO_3^-$), bicarbonate ($HCO_3^-$), perchlorate ($ClO_4^-$), and the like, which compete with PFAS for the positively charged sites on anion exchange resins, disclosed herein as "competing anions". The competing anions may significantly reduce the capacity of the anion exchange resin for PFAS removal.

Figure 1:
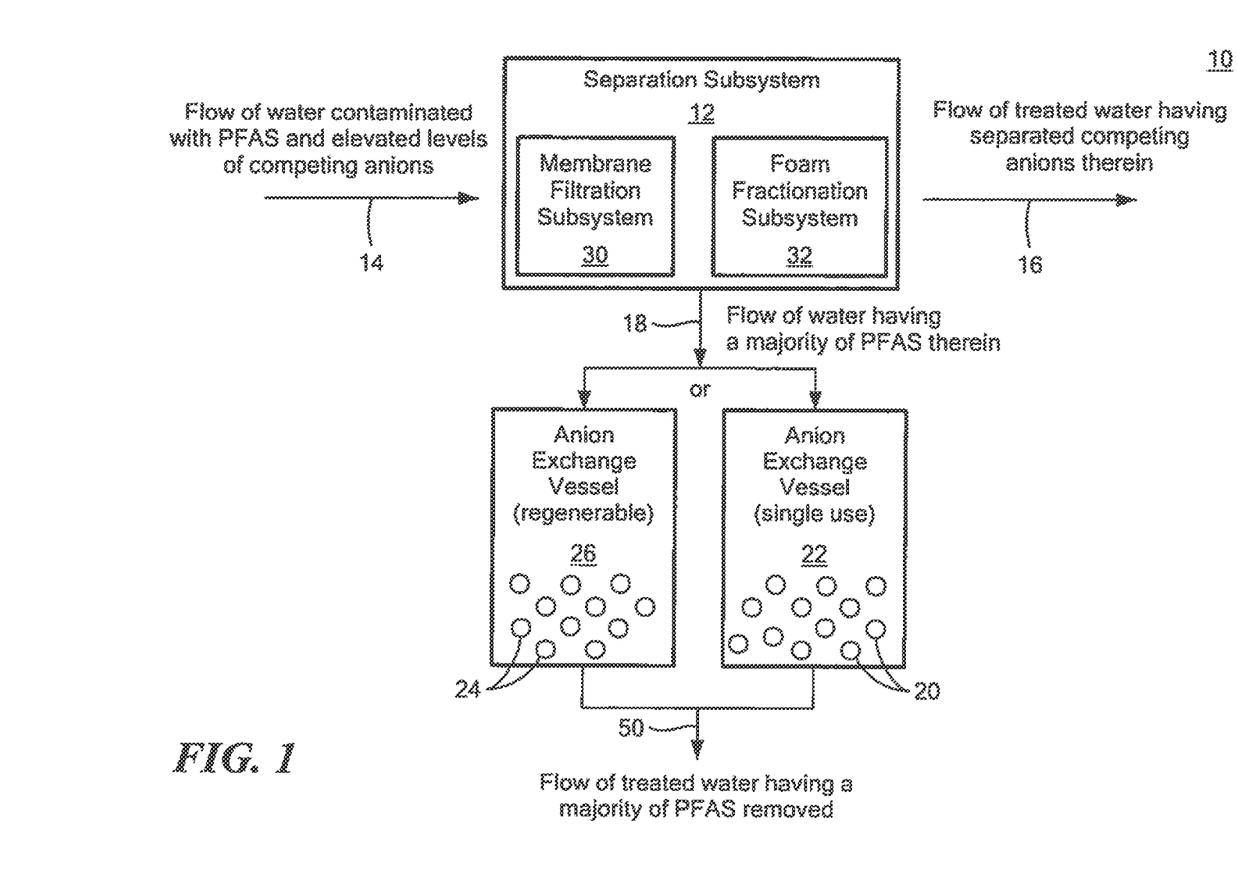
FIG. 1 is a schematic block diagram showing the primary components of one embodiment of the system for separating competing anions from PFAS in a flow of contaminated water.

There is shown in FIG. 1 one example of system 10 for separating competing anions from PFAS in a flow of water. System 10 includes separation subsystem 12 configured to receive flow 14 of water contaminated with PFAS and elevated levels of competing anions. Flow 14 may include one or more of industrial wastewater, municipal wastewater, landfill leachate, groundwater and/or similar type waters contaminated with PFAS and elevated levels of competing anions.

Separation subsystem 12 separates PFAS from competing anions and outputs treated flow 16 of water having separated competing anions therein and concentrated flow 18 of water having a majority of PFAS therein. Flow 16 of water having separated competing anions therein may include all, or a portion of, the competing anions in flow 14, e.g., from about 1% to about 100%. As discussed below, separating competing anions from the concentrated flow of water having a majority of PFAS therein increases the treatment capacity of an anion exchange resin in a vessel to remove PFAS from the contaminated water, e.g., a single use anion exchange resin exemplarily indicated at 20 in vessel 22 or regenerable anion exchange resin exemplarily indicated at 24 in vessel 26, typically located downstream from separation subsystem 12, such that the separated PFAS bind to the anion exchange resin to remove PFAS from the contaminated water to produce flow 50 of treated water having a majority of the PFAS removed.

In one example, single use anion exchange resin 20 in vessel 22 may be SORBIX PURE®, available from Emerging Compounds Treatment Technologies, Inc., Portland, Maine, AMBERLITE™ PSR2 Plus, available from DuPont, Wilmington, Delaware, PUROLITE™ PFA694E, available from Purolite, King of Prussia, PA, or similar type single use anion exchange resins. In another example, regenerable anion exchange resin 24 in vessel 26 may be SORBIX™ RePURE, available from Emerging Compounds Treatment Technologies, Inc., Portland, Maine, or similar type regenerable anion exchange resins.

In one example, separation subsystem 12 may include membrane separation subsystem 30. In one example, membrane separation subsystem 30, FIG. 2, may be configured as a nano-filtration subsystem as shown, e.g., available from Suez Water Technologies & Solutions, Trevose, PA. In other examples, membrane separation subsystem 30 may include an ultra-filtration subsystem, e.g., available from Suez Water Technologies & Solutions, Trevose, PA.

Figure 2:
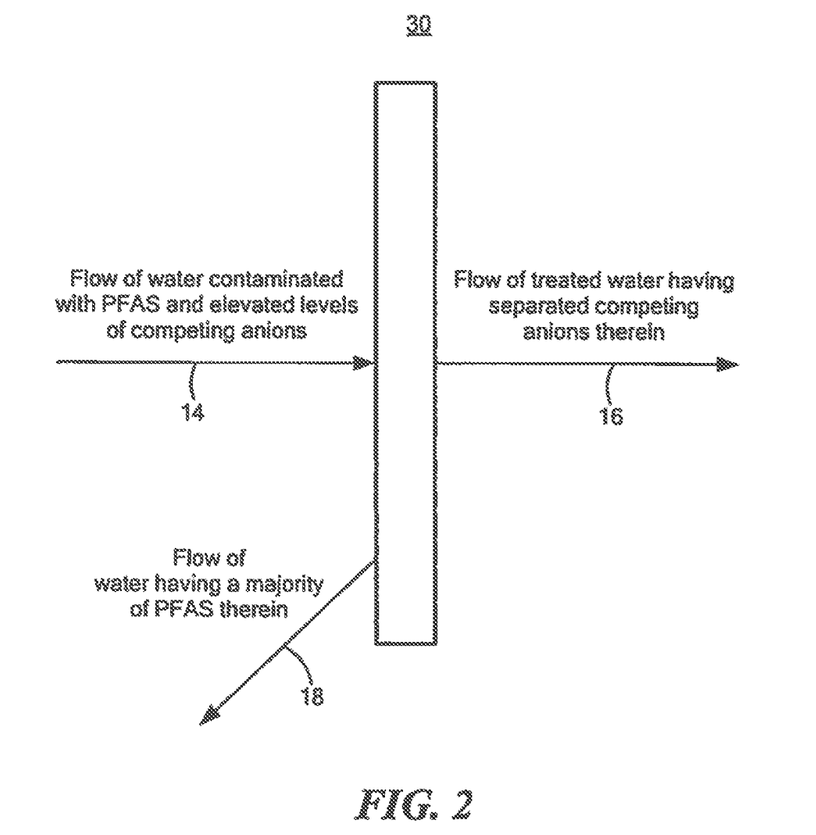
FIG. 2 is a schematic block diagram showing in further detail one example of the membrane filtration subsystem shown in FIG. 1.

In this example, membrane separation subsystem 30 receives flow 14 of water contaminated with PFAS and elevated levels of competing anions. Membrane separation subsystem 30 preferably outputs permeate stream or flow 16 of treated water including separated competing anions therein as discussed above. Membrane separation subsystem 30 also preferably outputs reject stream or concentrated flow 18 of water having a majority of PFAS therein. As disclosed herein, a "majority" is defined as greater than about 50%.

Concentrated flow 18 of water having a majority of PFAS therein is then directed to single use anion exchange resin 20, FIG. 1, in vessel 22 or regenerable anion exchange resin 24 in vessel 26 such that the rejected PFAS bind to the anion exchange resin to remove PFAS from the water to produce flow 50 of treated water having a majority of the PFAS removed.

PFAS are surfactants and have a high foaming potential. In another example, separation subsystem 12, FIG. 1, may include foam fractionation subsystem 32, FIG. 3, which receives flow 14 of water contaminated with PFAS and elevated levels of competing anions which fills vessel 34 with water contaminated with PFAS and elevated levels of competing anions. Diffuser subsystem 42 introduces gas 35 into the water contaminated with PFAS and elevated levels of competing anions in vessel 34 to generate microbubbles 36 and/or turbulence such that the PFAS in water attach to gas microbubbles 36 to form foam or foamate 38 at surface 40 and treated flow or raffinate 16 of water having separated competing anions therein. See FIG. 4 which shows examples of hydrophilic heads 43 and hydrophobic tails 44 of PFAS attaching to microbubbles 36.

Figure 3:
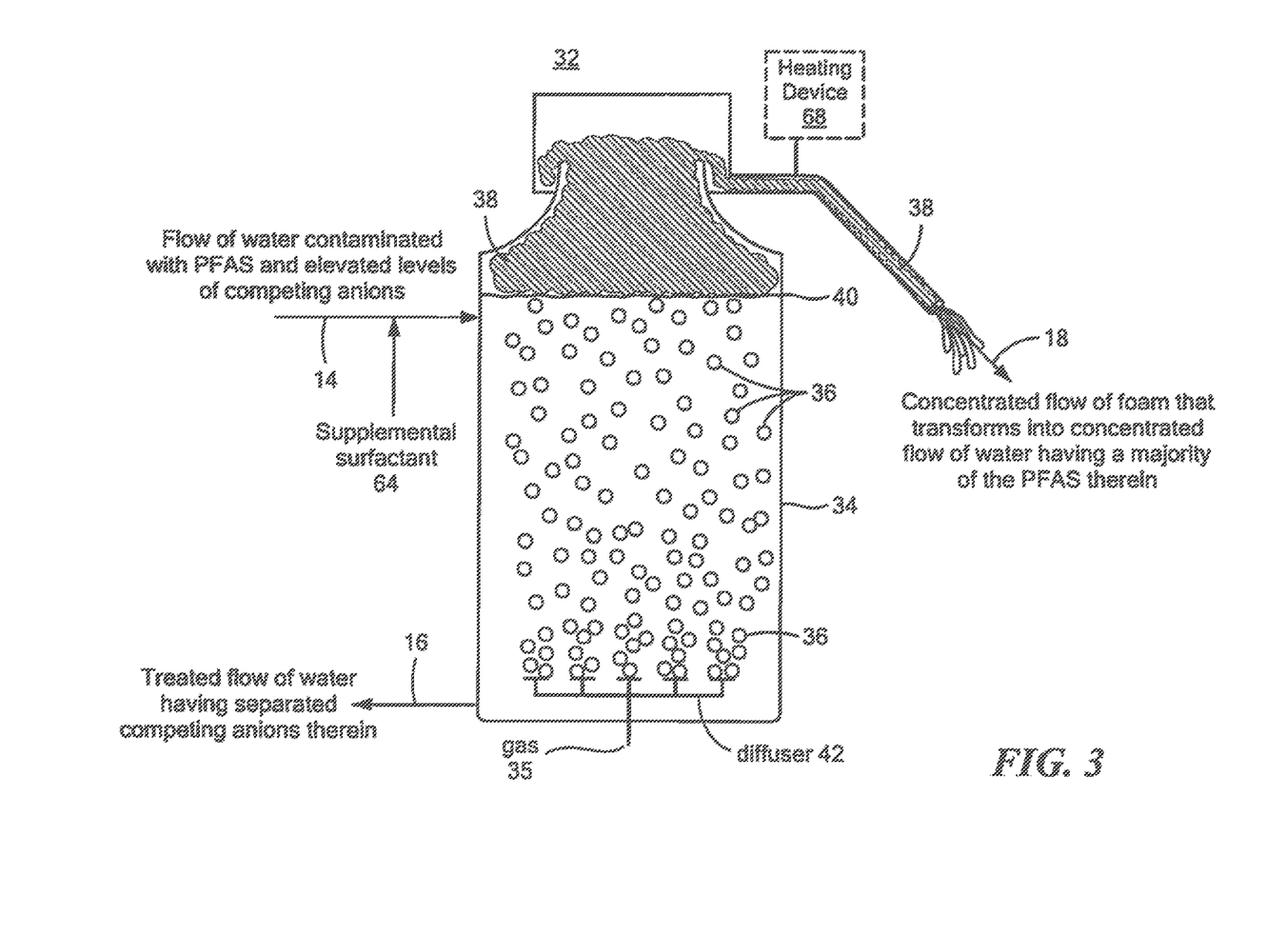
FIG. 3 is a schematic block diagram showing in further detail one example of the foam fractionation subsystem shown in FIG. 1.
Figure 4:
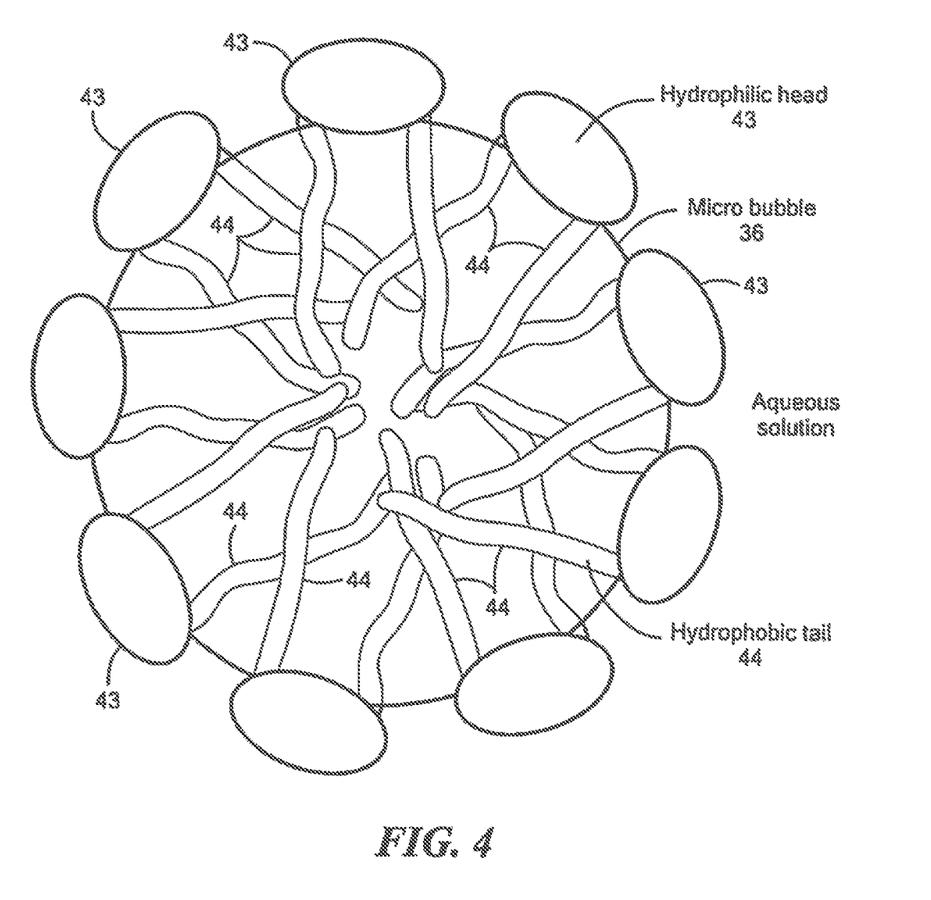
FIG. 4 shows examples of hydrophilic heads and hydrophobic tails of PFAS attaching to a microbubble.

Foam 38, FIG. 3, is preferably collapsed to form concentrated flow 18 of water having a majority of the PFAS therein. In one example, foam fractionation subsystem 32 may include heating device 68 which heats foam 38 to enhance the transformation or collapsing of foam 38 into concentrated flow 18 of water having a majority of the PFAS therein. The separated concentrated flow 18 of water having a majority of PFAS therein is then directed to single use anion exchange resin 20, FIG. 1, in vessel 22 or regenerable anion exchange resin 24 in vessel 26 such that the separated PFAS bind to the anion exchange resin to remove PFAS from the water to produce flow 50 of treated water having a majority of the PFAS removed.

Gas 35, FIG. 3, may be ambient air, nitrogen, ozone, or similar type gas that forms microbubbles. Foam fractionation subsystem 32 may include a modified diffuser subsystem, discussed below, which preferably increases the production and distribution of microbubbles 36 and foam 38.

Figure 5:
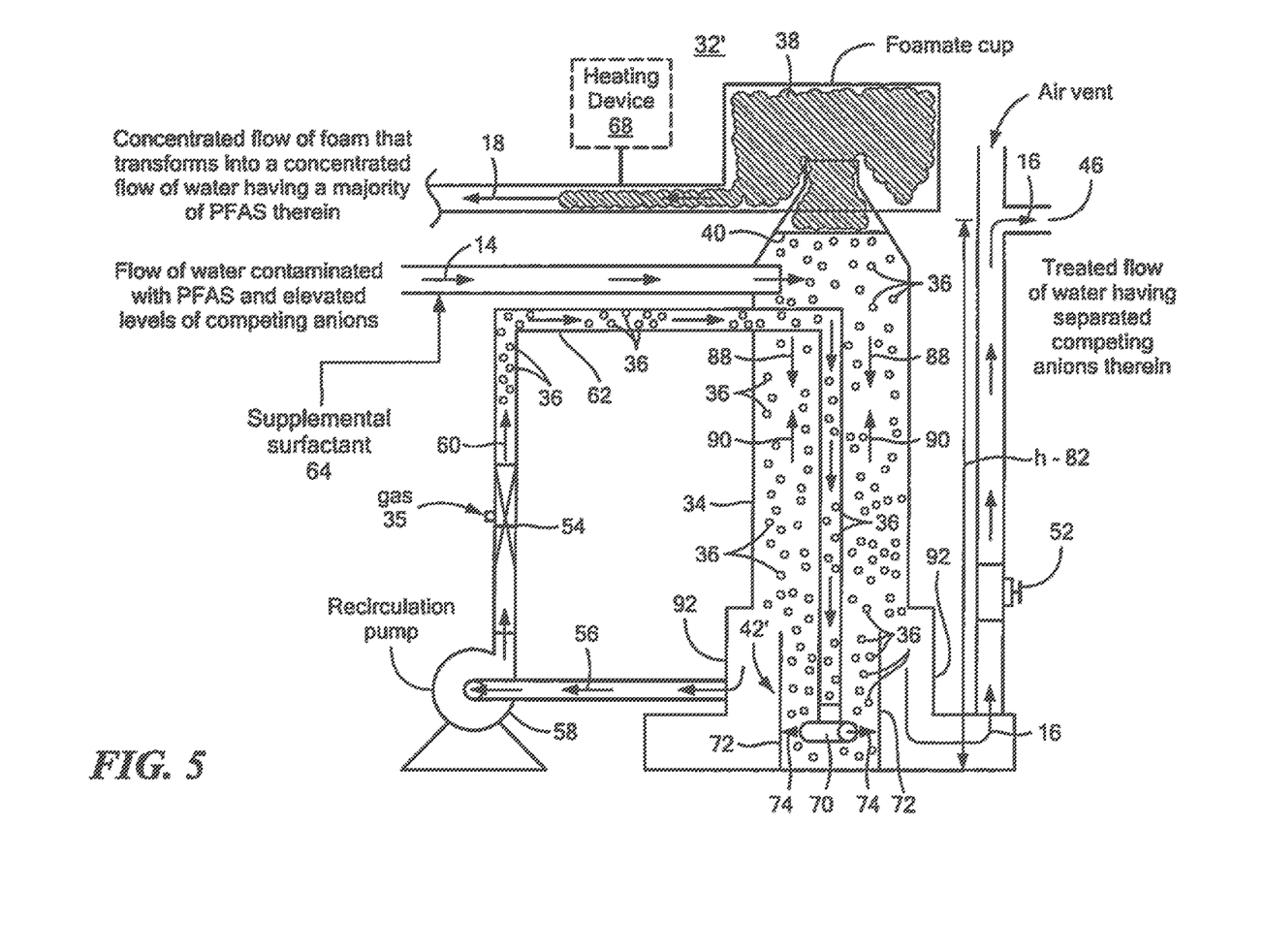
FIG. 5 is a schematic block diagram showing another embodiment of the foam fractionation subsystem shown in FIG. 1.

In one design, foam fractionation subsystem 32', FIG. 5, where like parts have been giving like numbers, includes vessel 34 which receives flow 14 of the water contaminated with PFAS and elevated concentrations of competing anions. Foam fractionation subsystem 32' preferably maintains the water contaminated with PFAS and elevated levels of competing anions in vessel 34 at a desired surface level, e.g., surface level 40, e.g., by setting outlet 46 to height h-82 and/or adjusting control valve 52.

Foam fractionation subsystem 32' also preferably includes venturi eductor 54 which introduces and mixes gas 35 into recycled flow 56 of water having separated competing anions therein provided by recirculation pump 58. Venturi eductor 54 preferably generates two-phase flow 60 of microbubbles 36 and water having separated competing anions therein in line 62. In one example, venturi eductor 54 may be available from Mazzei Injector Company, LLC., Bakersfield, CA 93307.

Foam fractionation subsystem 32' also preferably includes modified diffuser subsystem 42' which increases the production and distribution of microbubbles 36 and foam or foamate 38. Modified diffuser subsystem 42' preferably includes vortex tee 70 disposed inside cylindrical baffle 72 as shown. Vortex tee 70 receives the two-phase flow 60 by line 62 and induces rotational movement or vortex formation of the two-phase flow inside cylindrical baffle 72 to generate intense mixing and turbulence. The intense mixing and turbulence provided by modified diffuser subsystem 42' significantly increases the production and distribution of microbubbles 36, e.g., when compared to a conventional diffuser, e.g., as shown in FIG. 3, such that the more PFAS in flow 14 attach to the increased concentration of microbubbles 36 provided by modified diffuser subsystem 42' which increases the production and distribution of foam or foamate 38 at surface 40.

Figure 6:
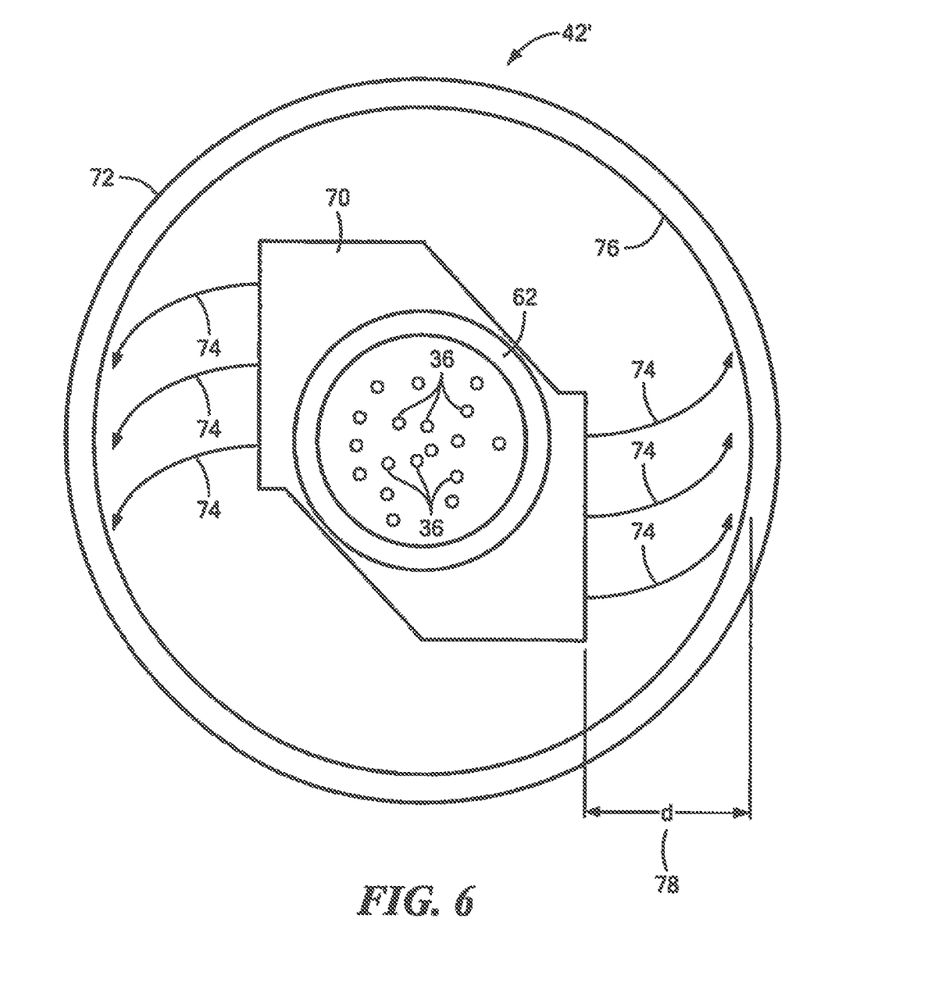
FIG. 6 is a top or plain view of the modified diffuser subsystem shown in FIG. 5.

FIG. 6 is top or plan view of modified diffuser subsystem 42' including vortex tee 70 and cylindrical baffle 72 and shows an example of the direction of two-phase flow 60, FIG. 5, toward surface 76, FIG. 6, of cylindrical baffle 72, indicated by arrows 74 (also shown in FIG. 5). Preferably, vortex tee 72 is spaced from surface 76 by a predetermined distance, e.g., distance d-78, to maximize the rotational movement or vortex formation, which generates intense mixing and turbulence to maximize the formation and distribution of microbubbles 36 and foam or foamate 38, FIG. 5. Distance d-78 will vary depending on the size of vessel 34. The diameter of cylindrical baffle 72 is preferably chosen to maximize the rotational movement or vortex formation. A diameter too large or too small will provide non-optimal rotational movement or vortex formation. The diameter of cylindrical baffle 72 will vary depending on the size of vessel 34.

In operation, flow 14, FIG. 5, of water contaminated with PFAS enters vessel 34. As flow 14 travels down vessel 34, indicated by arrows 88, the PFAS in flow 14 attach to the high concentration of microbubbles 36 provided by modified diffuser subsystem 42' and forms foam 38 at surface 40. As flow 14 travels further downward in vessel 34, against the upward two-phase flow of microbubbles and water having separated competing anions therein, indicated by arrows 90, more PFAS attaches to the highly concentrated microbubbles 36. By the time flow 14 reaches the bottom of vessel 34, indicated at 92, the majority of the PFAS have been removed and treated flow or raffinate 16 of water having separated competing anions therein is discharged, e.g., through outlet 46, and recycled flow 56 of water having separated competing anions therein is directed to venturi eductor 54.

Foam 38 is preferably collapsed to form concentrated flow 18 of water having a majority of the PFAS therein. Similar as discussed above with reference to FIG. 3, foam fractionation subsystem 32', FIG. 5, may include heating device 68 which heats foam 38 to enhance the transformation or collapsing of foam 38 into concentrated flow 18 of water having a majority of the PFAS therein. The separated concentrated flow 18 of water having a majority of PFAS therein is then directed to single use anion exchange resin 20, FIG. 1, in vessel 22 or regenerable anion exchange resin 24 in vessel 26 such that the separated PFAS bind to the anion exchange resin to remove PFAS from the water to produce flow 50 of treated water having a majority of the PFAS removed.

Cylindrical baffle 72, FIG. 5, is preferably sized and positioned, e.g., as shown, to separate the upward two-phase flow 90 of concentrated microbubbles 36 and water having separated competing anions therein from treated flow 16 of water having separated competing anions therein and recycled flow 56 of water having separated competing anions therein as they exit vessel 34.

In one example, foam fractionation subsystem 32, 32', FIGS. 3 and 5, may introduce at least one supplemental surfactant 64 to flow 14 to increase the production of microbubbles 36 and foam 38. Examples of supplemental surfactant 60 may include an anionic, cationic, zwitterionic, nonionic, and/or a protein-based surfactant.

Figure 7:
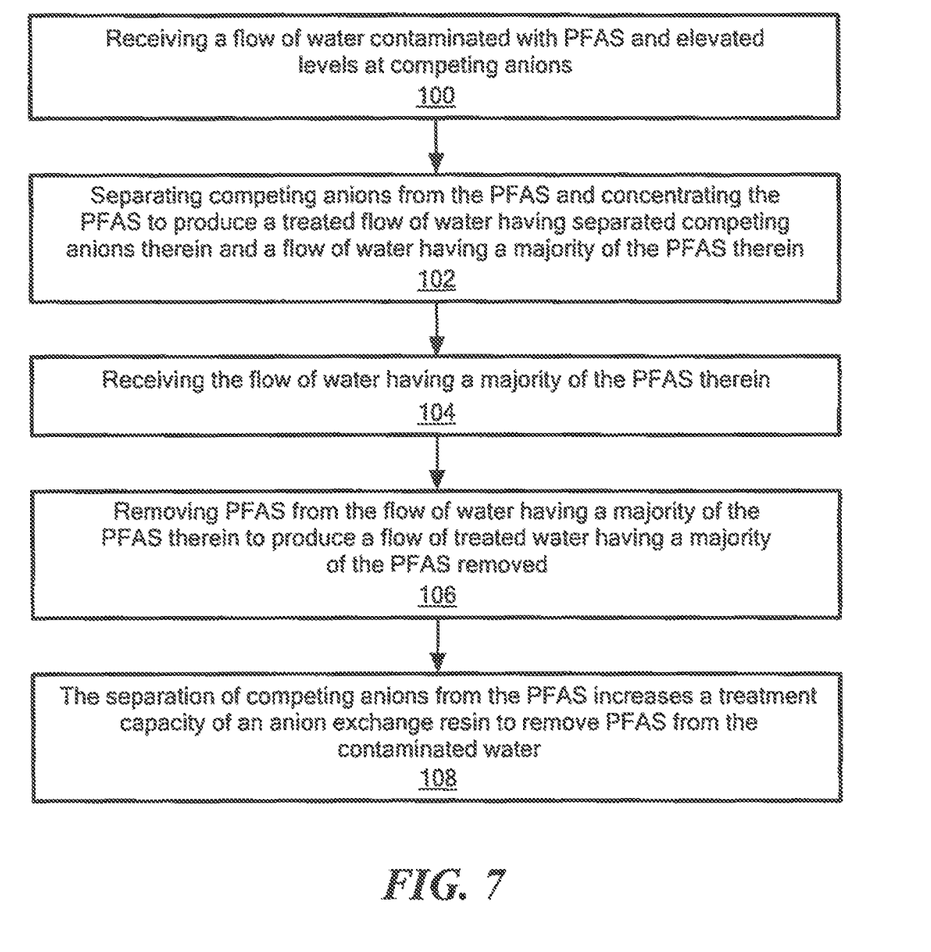
FIG. 7 is a flow chart showing one example of the primary steps of the method for separating competing anions from PFAS in a flow of contaminated water.

One example of the method for separating competing anions from per- and polyfluoroalkyl substances (PFAS) in the flow of water includes receiving a flow of water contaminated with PFAS and elevated levels of competing anions, step 100, FIG. 7. The method also includes separating competing anions from PFAS and concentrating the PFAS to produce a treated flow of water having separated competing anions therein and a flow of water having the water having the majority of the PFAS therein, step 102. The method also includes receiving a flow of water having a majority of the PFAS therein, step 104, and removing the PFAS from the flow of water having the majority of the PFAS therein to produce a treated flow of water having a majority of the PFAS removed, step 106. The separation of the competing anions from the PFAS increases a treatment capacity of an anion exchange resin to remove PFAS from the contaminated water, step 108.

The result is system 10 shown in one or more of FIGS. 1-6 effectively separates the competing anions from the concentrated flow of water having a majority of PFAS therein and increases the treatment capacity of an anion exchange resin in a vessel, e.g., single use anion exchange resin exemplarily indicated at 20 in vessel 22 or regenerable anion exchange resin exemplarily indicated at 24 in vessel 26 such that the separated PFAS bind to the anion exchange resin to remove PFAS from the water to produce treated water 50 having a majority of the PFAS removed.

Because separation subsystem 12 discussed above has removed the separated competing anions from flow 14, single use anion exchange resin 20 in vessel 22 or regenerable anion exchange resin 24 in vessel 26 is less compromised by competing anions. Therefore, the anion exchange resin lasts longer and does not need to be replaced or regenerated as frequently, which may significantly increase the treatment capacity to remove PFAS from contaminated water and may reduce the costs of operation.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A system for separating competing anions from per- and polyfluoroalkyl substances (PFAS) in a flow of water contaminated with PFAS and elevated levels of competing anions, the system comprising:
   a separation subsystem configured to receive the flow of water contaminated with PFAS and elevated levels of competing anions, the separation subsystem comprising a foam fractionation subsystem including a diffuser subsystem configured to enhance production and distribution of microbubbles and foam, a vessel configured to receive the flow of water contaminated with PFAS and elevated levels of competing anions, a venturi eductor configured to introduce and mix a gas into a recycled flow of water having separated competing anions therein and generate a two-phase flow of microbubbles and water having separated competing anions therein, the diffuser subsystem including a cylindrical baffle configured to receive the two-phase flow and induce rotational movement that generates intense mixing and turbulence to maximize the formation and distribution of microbubbles and foam to enhance PFAS removal from the contaminated water, the foam fractionation subsystem configured to separate competing anions from the PFAS and concentrate the PFAS to produce a treated flow of water having separated the competing anions therein and a separate flow of water having a majority of PFAS therein;
   at least one anion exchange vessel having an anion exchange resin therein configured to receive the flow of water having a majority of PFAS therein and remove PFAS from the water to produce a flow of treated water having a majority of the PFAS removed; and
   wherein the separation of competing anions by the separation subsystem increases the treatment capacity of the anion exchange resin to remove PFAS from the contaminated water.

2. The system of claim 1 in which the anion exchange resin includes a regenerable anion exchange resin.

3. The system of claim 1 in which the anion exchange resin includes a single use anion exchange resin.

4. The system of claim 1 in which the separation subsystem includes a membrane separation subsystem.

5. The system of claim 4 in which the membrane separation subsystem includes a nanofiltration subsystem.

6. The system of claim 4 in which the membrane separation subsystem includes an ultrafiltration subsystem.

7. The system of claim 1 in which the vortex tee is spaced from a surface of the cylindrical baffle by a predetermined distance to maximize the rotational movement and turbulence of the two-phase flow of microbubbles and water having separated competing anions therein.

8. The system of claim 1 in which the cylindrical baffle is sized and positioned to separate the two-phase flow of microbubbles and water having separated competing anions therein from the treated flow of water having a majority of the PFAS removed which exits a bottom of the vessel.

9. The system of claim 1 in which the foam fractionation subsystem is configured to produce a concentrated flow of foam that transforms into the flow of water having the majority of the PFAS therein.

10. The system of claim 9 in which the foam fractionation subsystem includes a heating device configured to enhance the transformation of the foam into the flow of water having the majority of PFAS therein.

11. The system of claim 1 in which the competing anions include one or more of: chloride, sulfate, nitrate, bicarbonate, and perchlorate.

12. The system of claim 1 in which the flow of water contaminated with PFAS and elevated levels of competing anions includes industrial wastewater.

13. The system of claim 1 in which the flow of water contaminated with PFAS and elevated levels of competing anions includes landfill leachate.

14. The system of claim 1 in which the flow of contaminated with PFAS and elevated levels of competing anions includes contaminated groundwater.

15. The system of claim 1 in which at least one supplemental surfactant is added to increase the production of microbubbles and foam in the foam fractionation subsystem.

16. The system of claim 15 in which the at least one supplemental surfactant includes an anionic, cationic, zwitterionic, nonionic, and/or a protein-based surfactant.

17. A method for separating competing anions from per- and polyfluoroalkyl substances (PFAS) in a flow of water contaminated with PFAS and elevated levels of competing anions, the method comprising:
   receiving the flow of water contaminated with PFAS and elevated levels of competing anions;
   separating competing anions from the PFAS using foam fractionation to increase the production of microbubbles and foam and concentrating the PFAS to produce a treated flow of water having separated competing anions therein and a flow of water having a majority of the PFAS therein;

introducing and mixing a gas into a recycled flow of water having separated competing anions therein and generating a two-phase flow of microbubbles and water having the separated competing anions therein, receiving the two-phase flow in a cylindrical baffle and inducing rotational movement that generates intense mixing and turbulence to maximize formation and distribution of the microbubbles and foam;

receiving the flow of water having a majority of the PFAS therein;

removing PFAS from the flow of water having a majority of the PFAS therein to produce a flow of treated water having a majority of the PFAS removed; and wherein the separation of competing anions from the PFAS increases a treatment capacity of an anion exchange resin to remove PFAS from the contaminated water.

18. The method of claim 17 in which the anion exchange resin includes a regenerable anion exchange resin.

19. The method of claim 17 in which the anion exchange resin includes a single use anion exchange resin.

20. The method of claim 17 in which the separating includes membrane separation.

21. The method of claim 20 in which the membrane separation includes nanofiltration.

22. The method of claim 20 in which the separation includes ultrafiltration.

23. The method of claim 17 including separating the two-phase flow of microbubbles and water having separated competing anions therein from the treated flow of water having separated competing anions therein.

24. The method of claim 17 in which the foam fractionation is configured to produce a concentrated flow of foam that transforms into the flow of water having the majority of the PFAS therein.

25. The system of claim 24 in which the foam fractionation includes heating the foam to enhance the transformation of the foam into the flow of water having the majority of PFAS therein.

26. The method of claim 17 in which the competing ions include one or more of: chloride, sulfate, nitrate, bicarbonate, and perchlorate.

27. The method of claim 17 in which the flow of water contaminated with PFAS and elevated levels of competing anions includes industrial wastewater.

28. The method of claim 17 in which the flow of water contaminated with PFAS and elevated levels of competing anions includes landfill leachate.

29. The method of claim 17 in which the flow of water contaminated with PFAS and elevated levels of competing anions includes contaminated groundwater.

30. The method of claim 17 including adding a supplemental surfactant to increase the productions of microbubbles and foam.

31. The method of claim 30 in which the supplemental surfactant includes an anionic, cationic, zwitterionic, nonionic, and/or a protein-based surfactant.

* * * * *